United States Patent [19]
Canepa

[11] 3,723,225
[45] Mar. 27, 1973

[54] SLIDE FASTENER COATING APPARATUS AND METHOD

[75] Inventor: William P. Canepa, Forest Hills, N.Y.

[73] Assignee: Kay-Cee Industrial Products Inc., New York, N.Y.

[22] Filed: Mar. 30, 1971

[21] Appl. No.: 129,449

[52] U.S. Cl. .................. 156/554, 156/66, 156/306, 156/583
[51] Int. Cl. ............................................ B30b 15/34
[58] Field of Search ................ 156/583, 66, 306, 554

[56] References Cited

UNITED STATES PATENTS

| | | |
|---|---|---|
| 3,410,745 | 11/1968 | Canepa ............................ 156/554 |
| 3,283,395 | 11/1966 | Rownd ............................. 156/583 X |
| 3,490,972 | 1/1970 | Rogers ............................. 156/306 X |
| 3,510,379 | 5/1970 | Heimberger ....................... 156/66 X |

Primary Examiner—Edward G. Whitby
Attorney—Darby & Darby

[57] ABSTRACT

An apparatus and method are disclosed for continuously fusing a thermoplastic material to a slide fastener stringer to enable installation of the slide fastener in a garment or other article by a heat sealing process. The apparatus includes a heated pressure plate in association with a heated padded roller to fuse a strip of thermoplastic material to a fabric tape portion of a slide fastener stringer. One or both the pressure plate and the heated roller have non-stick or release-coated working surfaces.

7 Claims, 4 Drawing Figures

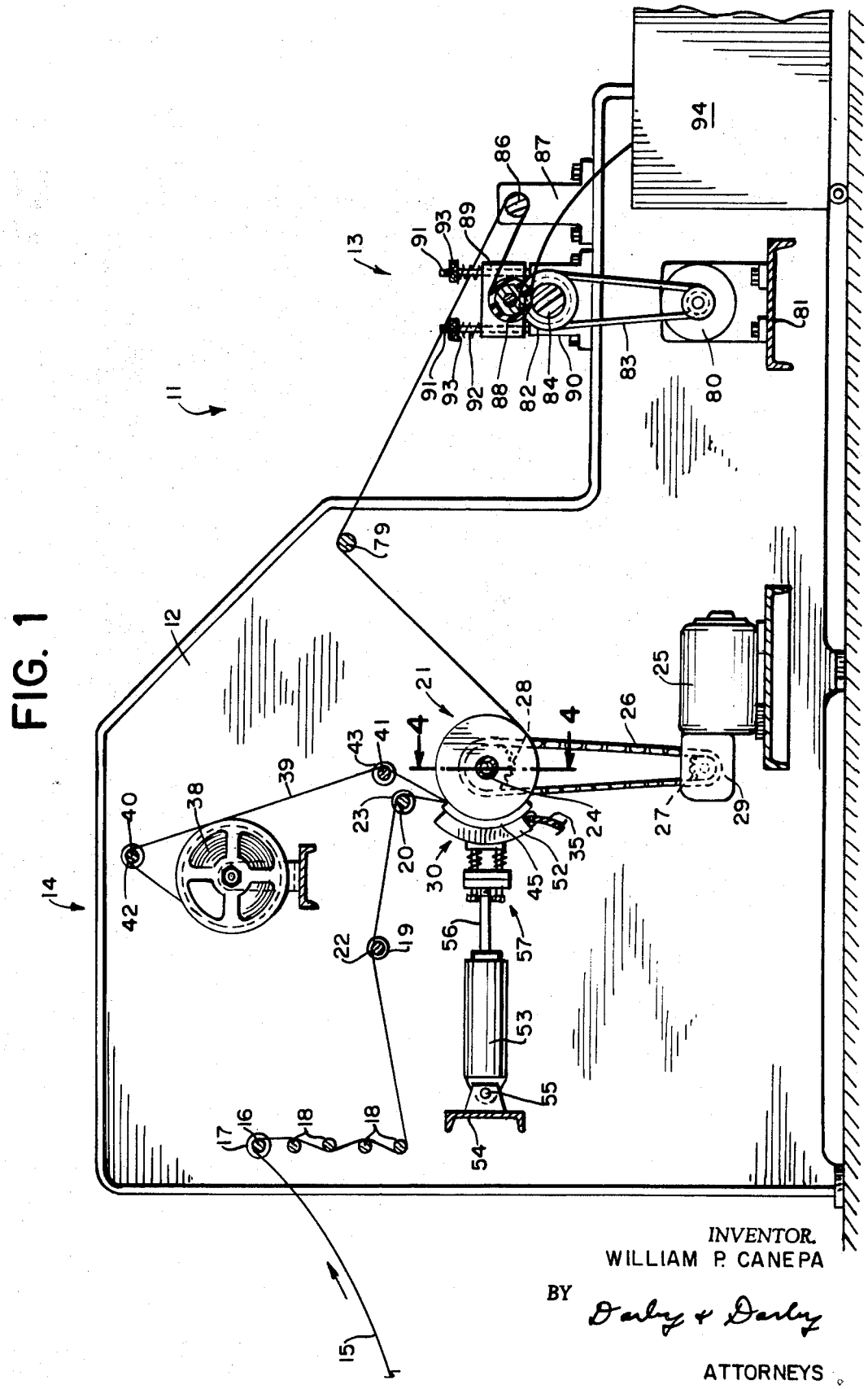

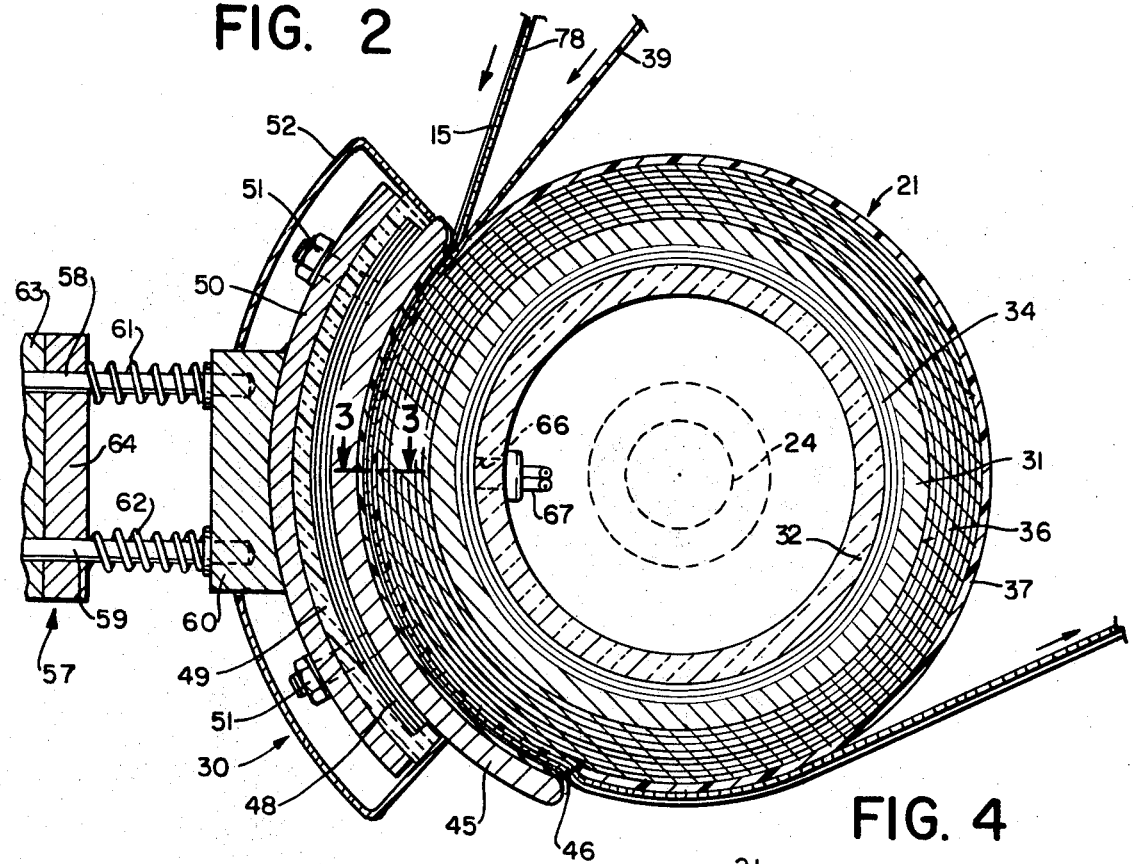
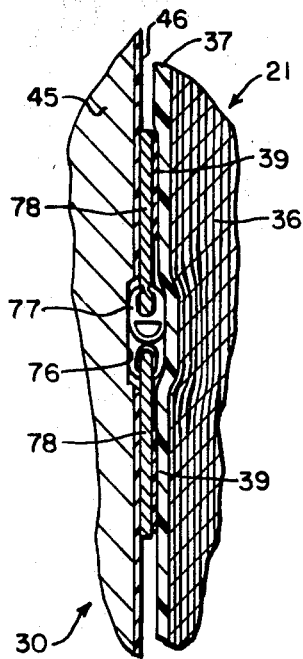
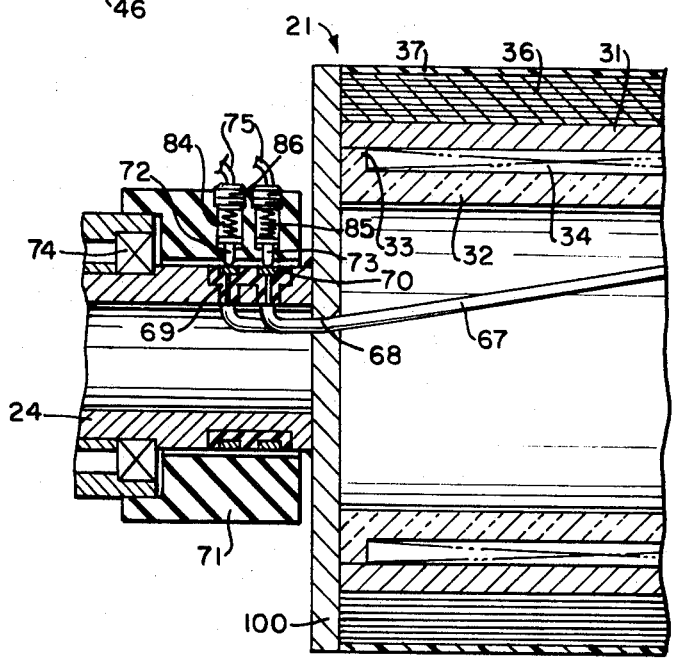

SLIDE FASTENER COATING APPARATUS AND METHOD

The present invention relates to an apparatus and method for coating a thermoplastic material to a slide fastener (zipper) stringer to enable the stringer (and the slide fastener) to be installed in a garment or other article by a heat sealing operation rather than a sewing operation.

Applicant's U. S. Pat. No. 3,410,745, issued Nov. 12, 1968, describes an apparatus for applying a heat sealing material to a slide fastener stringer. As set out therein, it is advantageous to adapt a slide fastener to be secured by means of a heat sealing operation rather than by the conventional sewing operation. The apparatus described in the aforementioned patent required that the thermoplastic material to be coated onto the slide fastener stringers be provided as a coating on one side of a paper tape or support. After the thermoplastic material had been applied to the slide fastener stringer, the support or tape was stripped away.

A support was required for the thermoplastic material to prevent its adherence to surfaces other than the slide fastener stringer during the application of the thermoplastic material to the stringer surfaces. The necessity for using a support for the thermoplastic material was uneconomical as the support was ultimately discarded and added no value to the finished product. In addition, the presence of the support slowed the rate at which thermoplastic material could be applied to a continuous strip of slide fastener stringers.

It is an object of the present invention to provide an improved apparatus and method for adapting slide fasteners for installation by a heat sealing process.

It is a further object of the present invention to provide such apparatus wherein the thermoplastic material need not be supplied on a support thereby providing improved economy and speed of operation.

These and other important and related objects and advantages will be apparent after considering the following specification in connection with the appended drawings, in which:

FIG. 1 is a partially schematic side elevation showing apparatus according to the present invention.

FIG. 2 is an enlarged cross-sectional view of a portion of the apparatus shown in FIG. 1.

FIG. 3 is a further enlarged sectional view along the line 3—3 of FIG. 2, and

FIG. 4 is an enlarged sectional view of a portion of the apparatus shown in FIG. 1 taken along the line 4—4 of FIG. 1.

Referring now to FIG. 1, a slide fastener coating apparatus 11 is illustrated. Apparatus 11 is mounted on frame 12 and consists of two main sections, take-up and storage section 13 and processing section 14. A continuous slide fastener stringer 15, which includes two fabric tape strips held together by means of their respective associated slide fastener elements or scoops, is fed from a reel or bin (not shown) into the processing section 14 of the apparatus via a guide rod 16. Slide fastener apparatus 11 is illustrated in operation with two slide fastener stringers 15 being simultaneously processed; however, it will be understood that the apparatus can be easily altered to process a greater or lesser number of slide fastener strips.

The slide fastener stringers 15 are introduced into the processing section 14 of apparatus 11 via guide rod 16, the stringers being kept in lateral spaced relation by collar 17. The stringer is then led over a series of tensioning rollers 18 and over guide rods 19 and 20 into frictional contact with padded roller 21. Collars 22 and 23 serve to hold the various stringers 15 in proper alignment. Padded roller element 21 is rotatably mounted on shaft 24 which is journalled at both ends in frame 12. Drive motor 25 provides the power for rotating padded roller element 21 and shaft 24 via chain drive 26. It will be noted that gears 27 and 28 which cooperate with chain drive 26 are of different sizes and can be interchanged to provide a variety of speeds to padded roller 21. As illustrated in FIG. 1, padded roller 21 is geared down through gear 28 to rotate at a slower rate than gear 27 which is directly driven by the shaft of motor 25. In addition, the speed of padded roller element 21 can be controlled through a variable speed gear box 29.

An arcuate heating and pressure element 30 is adapted to contact a portion of the surface of padded roller 21. The construction of heating and pressure element 30 and padded roller element 21 will best be understood by referring to FIG. 2.

Padded roller element 21 is formed on metal drum or cylinder 31. A refractory liner in the shape of a sleeve 32 is formed with shoulders 33 at each end and carries a heating element 34. These shoulders serve to align and position a heating element 34 between the sleeve 32 and metal cylinder 31. Metal cylinder 31 is in contact with heating element 34 and serves as a suitable conductor to heat the padded layer 36 which consists of a plurality of sheets or layers of a deformable padding material formed around metal sleeve 31. Among the suitable padding materials of which padding layer 36 can be fabricated are cotton and high temperature rubber. Surrounding the padding layer 36 is a covering 37 or coating of a suitable non-stick release material, including inter alia synthetic, nylon and fiber glass fabrics coated on either one or both sides with any of a number of suitable fluorocarbon resins (e.g., TEFLON fluorocarbon resin). It is essential that the synthetic fabric have an effective release material coated thereon to prevent the fusible thermoplastic material from adhering to padded roller element 21 and pulling away from the slide fastener stringers. High temperature nylon fabric coated with polytetrafluoroethylene resin, or a glass fabric coated on either or both sides with a similar fluorocarbon resin, is particularly preferred as an outer covering for the padded layer 36. A particularly preferred fabric for covering 37 having excellent low friction characteristics as well as a high degree of chemical and solvent resistance, unusual high and low temperature stability and extreme mechanical strength, is manufactured by E. I. du Pont de Nemours and Co., Wilmington, Delaware, under the trademark ARMALON. As employed in this invention, the ARMALON consists of a high temperature nylon fabric coated on both sides with a tetrafluorethylene (TEFLON) composition. It should be noted, however, that the padded layer 36 can alternatively be covered with a sleeve of shrinkable polytetrafluoroethylene film. Still another possibility is to apply a spray coating of a tetrafluoroethylene composition on the fabric of which padded layer 36 is formed.

Referring again to FIG. 1, it will be seen that a strip or web of a suitable thermoplastic material 39 from a supply reel 38 is fed over guide rods 40 and 41 towards padded roller element 21. Collars 42 and 43 on guide rods 40 and 41 serve to align each web of thermoplastic material 39 and guide it into juxtaposition with slide fastener stringer 15 on padded roller element 21. It will be understood that the webs or strips of thermoplastic material 39 are paired, there being twice as many supply reels 38 as there are slide fastener stringers 15. This construction provides a single web or strip of thermoplastic material 39 over each slide fastener fabric tape 78. Alignment of the strips of thermoplastic material 39 with the fabric strips is also assured by collars 42 and 43.

As will be seen in greater detail by referring to FIG. 2, slide fastener stringer 15 and the strip or web of thermoplastic material 39 are brought into juxtaposition over a portion of the surface of padded roller element 21.

Arcuate heating and pressure element 30 is shown in association with a portion of the release-coated surface 37 of padded roller 21.

Heating and pressure element 30 includes a metallic soleplate 45, which is also covered with a release coating or fabric 46 similar to covering 37 on padded layer 36 of padded roller element 21. A heating element 48 contacts the rear portion of soleplate 45. A layer of heat insulating material 49 such as asbestos or the like covers the rear portion of heating element 48. Insulation layer 49 and heating element 48 are secured between soleplate 45 and metal retaining plate 50 by fasteners 51 which are shown as threaded studs depending from soleplate 45 and including nuts to securely retain the intermediate heating and insulation layers in place. Heating and pressure element 30 includes a heat shield or housing 52 as a desirable optional feature.

The location of heating and pressure element 30 is such that it may be easily urged into contact with padded roller element 21 or separated therefrom to enable insertion and threading of slide fastener stringers and webs or strips of thermoplastic material.

Although it is desirable to thread and adjust heating and pressure element 30 manually, automatic actuation apparatus is preferably employed for continuous processing of slide fastener stringers. As illustrated in FIG. 1, an air cylinder 53, pivotally mounted on shaft 55 which is in turn held by bracket 54 joined to frame 12, is used to provide automatic actuation of heating and pressure element 30. Air cylinder 53 includes a piston (not shown) which drives a piston rod 56 which is in turn coupled to a spring-loaded apparatus 57 which functions to regulate the pressure applied by heating and pressure element 30 on padded roller element 21. Apparatus 57 comprises two parallel shafts 58 and 59 depending from a pressure plate 60 which is secured to a metal retaining plate 50 of heating and pressure element 30. Coil springs 61 and 62 are mounted around shafts 58 and 59 which run through support blocks 63 and 64, support block 63 being connected to piston rod 56 and held in position against block 64 by the action of coil springs 61 and 62. Rotating elements 65 and 66 are mounted in threaded apertures and in coaxial engagement with the ends of shafts 58 and 59 within blocks 63 and 64 respectively. By turning elements 65 and 66, the compression of springs 61 and 62 can be regulated and in this manner more precise control can be exercised over the amount of pressure exerted upon padded roller element 21 by heating and pressure element 30.

Temperature sensing element 35 is mounted on or in close proximity to soleplate 45 to provide accurate temperature control of the soleplate in conjunction with either automatic or manual temperature control apparatus (not shown).

Referring again to FIG. 2, it will be seen that insulation sleeve 32 bears an aperture 66 through which power cables 67 are conducted to heating element 34. Padded roller element 21 is heated while rotating with shaft 24 and the following apparatus is provided to connect cables 67 to an appropriate power source.

Padded roller 21 is attached to shaft 24, which is journalled in an insulated portion of frame 12 and rotates along with padded roller 21. Cables 67 are run through aperture 68 in cylinder end plate 100, the center of shaft 24, and terminate in a set of parallel conductive metallic tracks 69 and 70 circumscribed beneath the surface of shaft 24. Conductive metallic brushes 72 and 73 protrude from stationary member 71 positioned in opposition to the surface of shaft 24 and contact metallic tracks 69 and 70 respectively. It will be understood that brushes 72 and 73 are connected to a suitable power supply and serve to contact metallic tracks 69 and 70 as padded roller 21 and associated shaft 24 rotate on journalled bearings 74. Brushes 72 and 73 are connected to an appropriate power source by means of cables 75 and conductor springs 84 and 85 mounted in identical holders 86 which maintain the brushes in contact with conductive tracks 69 and 70.

Referring now to FIG. 3, the relative position of the slide fastener stringer 15 and the strip of thermoplastic material 39 is illustrated in detail as they pass between padded roller element 21 and heating and pressure element 30. It will be seen in FIG. 3 that soleplate 45 is provided with indentations or grooves 76 to accommodate the scoop-like slide fastener elements 77 which join two individual fabric tape strips 78 in the conventional fashion (to form a slide fastener stringer 15), and that release covering 37 and padded layer 36 are slightly deformed by fastener elements 77 when the slide fastener stringer 15 and the thermoplastic strip 39 are pressed between padded roller element 21 and soleplate 45. The non-stick coating 46 on the face of soleplate 45 does not extend down into grooves 76 in the illustrated embodiment of the invention, although such a construction is possible. Lying between each fabric strip 78 and release coating 37 on padded layer 36 is a web or strip of a suitable thermoplastic material 39. A wide variety of fusible thermoplastic materials can be used in the apparatus and method of this invention and include inter alia thermoplastic vinyl resins, nylon resins, polyurethane resins, polyester resins and polyethylene.

As the fastener strips 15 and strips of thermoplastic material 39 are guided between the release-coated pressure and heating element 30 and padded roller element 21, air cylinder 53 is actuated to urge heating and pressure element 30 against padded roller element 21. It will be understood that the heating element 48 of heating and pressure element 30 will have already been actuated to heat soleplate 45 to the proper temperature (generally between 275° to 400° Fahrenheit). In addition, pressure adjustment apparatus 57 will have been adjusted in conjunction with air cylinder 53 to apply the proper amount of pressure against padded roller element 21. The pressure is supplied for a sufficient time to melt the thermoplastic material 39 and cause it to penetrate into each of the individual fabric strips 78 of the slide fastener stringer 15.

The release-coated surfaces 46 and 37 prevent the excess thermoplastic material which has not penetrated the individual fabric strips 78 from adhering to the surface of padded roller element 21 or heating and pressure element 30. Upon emerging from between the heating and pressure element 30 and the padded roller element 21, the slide fastener stringer 15 and the strips of thermoplastic material 39 have been united and only a single element, slide fastener stringer 15, is visible having a coating of heat sealable thermoplastic material on and within each of its individual fabric strips 78 which are still joined by slide fastener elements 77.

Each slide fastener stringer 15 is then guided into take-up and storage section 13.

Take-up and storage section 13 consists of a motor 80 mounted on support plate 81 and connected to drive pulley 82 at belt 83. Pulley 82 is secured to shaft 84 which rotates therewith. The shaft 84 is supported in bearings 85 and has mounted thereon rollers (not visible) with a resilient surface such as rubber. Each slide fastener stringer 15 is guided over support rod 79 to guide bar 86 which is supported in bracket 87. Slide fastener stringer 15 is then guided around free running roller 88 which also has a resilient surface. Free running roller 88 contacts the resilient roller (not visible) on shaft 84 and is driven by contacting these rollers. Means may be provided for adjusting the pressure between free running roller 88 and the rollers on shaft 84, such as a slidably mounted section 89 of bracket 90. Slidably mounted section 89 is supported by elongated studs 91 which also support springs 92. Adjustment nuts 93 are provided on a threaded end portion of elongated studs 91 for adjusting the compression of springs 92 and hence the pressure between free running roller 88 and the resilient rollers (not visible) on shaft 84. Motor 80 is preferably geared to tend to drive the slide fastener stringer 15 between free running roller 88 and the rollers on shaft 84 at a speed slightly in excess of the speed at which it is driven by padded roller 21. The pressure between free running rollers 88 and the resilient rollers on shaft 84 is such that a small amount of slippage can take place, but a substantially uniform tension is nonetheless maintained on slide fastener stringer 15.

The slide fastener stringer 15 is then collected in a storage device 94 which may comprise automatic reeling apparatus (not shown). In other cases it is desirable to collect the slide fastener stringer loosely in bulk, reel it onto drums and inspect it in a subsequent operation. The take-up and storage section 13 is illustrated and explained in greater detail in U.S. Pat. No. 3,410,745 of W. P. Canepa.

It will be understood that the speed of processing of the apparatus is based upon the amount of time necessary to melt the thermoplastic material and allow it to coat and impregnate the individual fabric strips 78 of slide fastener stringer 15. Thus, the diameter of padded roller 21, the length of soleplate 46, the melting point of the thermoplastic material, and the amount of pressure exerted by heating and pressure element 30 are additional factors governing the rate of production of impregnated slide fastener stringers.

As a general rule, the rate of production may be increased by increasing the diameter of padded roller 21. Similarly, by raising the temperature of soleplate 45 to approximately 375° to 400° F, the rate of production may be substantially increased as the thermoplastic material will reach its melting point and begin to impregnate the slide fastener stringers in a shorter period of time. The production rate can be further increased by employing heating element 34 to heat metal cylinder 31 of padded roller element 21. In this manner, the slide fastener stringer and the strip of thermoplastic material are pressed between two heated surfaces. Melting and penetration of the thermoplastic material into the fabric strips will occur more rapidly using this technique, and the contact time between heating and pressure element 30 and padded roller element 21 will be decreased. When using the foregoing method, the temperature to which soleplate 45 and metal cylinder 31 must be heated may be lower than when only a single heated surface is employed.

A still further method employs only the heating element 34 in padded roller element 21. The heat from padded roller element 21 will be sufficient to soften and melt the strip of thermoplastic material without the need for heating the fabric with heating and pressure element 30. Although the heat from padded roller element 21 is sufficient to melt and impregnate thermoplastic material 39 and less heat loss is encountered, a faster rate of production can be obtained utilizing the technique wherein both heating and pressure element 30 and padded roller element 21 are heated by their individual heating elements.

It should also be noted that as the melting point of the thermoplastic material decreases, the rate of production will increase. The use of thermoplastic materials having a higher melting point (above 225° to 250°F) will slow down the rate of production by requiring longer contact times between heating and pressure element 30 and padded roller element 21 unless the surfaces of both these elements are heated. When using thermoplastic materials having a high melting point (300° to 425°F), the technique wherein the heating elements in both padded roller element 21 and heating and pressure element 30 are heated should be employed.

It will be seen from the foregoing description that an improved apparatus and method for heating and coating slide fastener stringers has been described. In particular, the apparatus and method of this invention permit a faster rate of production of coated slide fastener stringers and additionally eliminate the necessity for supplying a support which must later be removed for the thermoplastic material which is to be fused to the slide fastener strips. It will additionally be noted that the release-coated elements of this invention are easily maintained in a clean condition, free from excess thermoplastic material which would normally be difficult to remove from a surface in the hardened condition.

What is claimed is:

1. In an apparatus for providing a thermoplastic coating on a slide fastener stringer, the improvement which comprises a deformable padded roller having a deformable release-coated work surface, means for conducting a continuous length of said slide fastener stringer over a portion of said release-coated work surface, means for conducting an unsupported thermoplastic strip over said release-coated work surface in juxtaposition with said slide fastener stringer, pressure means having a release-coated pressure surface bearing an indentation adapted to receive a scoop-shaped fastener element and adapted to contact a preselected portion of said slide fastener stringer and including means for heating said release-coated pressure surface to a predetermined temperature above the melting point of said unsupported thermoplastic strip during the time said pressure means contacts said slide fastener stringer, and a pressure actuation apparatus operable to urge said release-coated pressure surface against said release-coated work surface for a predetermined period to fuse said unsupported thermoplastic strip to a fabric strip portion of said slide fastener stringer.

2. In an apparatus for providing a thermoplastic coating on a slide fastener stringer, the improvement which comprises a deformable padded roller having a deformable release-coated work surface, means for conducting a continuous length of said slide fastener stringer over a portion of said deformable release-coated work surface, means for conducting an unsupported thermoplastic strip over said release-coated work surface in juxtaposition with said slide fastener stringer, pressure means having a release-coated pressure surface bearing an indentation adapted to receive a scoop-shaped fastener element and adapted to contact a preselected portion of said fastener stringer and including means for heating said release-coated pressure surface to a predetermined temperature above the melting point of said unsupported thermoplastic strip during the time said pressure surface contacts said slide fastener stringer, a pressure adjustment apparatus interposed between said pressure means and a pressure actuation apparatus operable to urge said release-coated pressure surface against said deformable release-coated work surface for a predetermined period to fuse said unsupported thermoplastic strip to a fabric strip portion of said slide fastener stringer.

3. In an apparatus for providing a thermoplastic coating on a slide fastener stringer, the improvement as recited in claim 2 wherein said padded roller comprises a metal cylinder, a refractory liner formed within said metal cylinder, a heating element in contact with said refractory liner and said metal cylinder, a plurality of padding layers formed around said metal cylinder and between said metal cylinder and said release-coated work surface.

4. In an apparatus for providing a thermoplastic coating on a slide fastener stringer, the improvement as defined in claim 3, further including means for rotating said padded roller and means for transmitting power to said heating element while said roller is rotating, including a pair of metallic tracks circumscribed about a shaft adapted to rotate with said padded roller, a stationary bracket mounted in association with said shaft and bearing a pair of brushes adapted to contact said metallic tracks while said shaft is rotating.

5. In an apparatus for providing a thermoplastic coating on a slide fastener stringer, the improvement which comprises a heated deformable padded roller bearing a deformable non-stick release layer, means for conducting a continuous length of said slide fastener stringer over said deformable non-stick release layer, means for conducting an unsupported thermoplastic strip in juxtaposition with said slide fastener stringer over said non-stick release layer, means for rotating said heated padded roller, pressure means having a non-stick release-coated surface adapted to receive a fastener portion of said slide fastener stringer and to hold a portion of said slide fastener stringer and said unsupported thermoplastic strip in contacting relationship against said heated padded roller for a predetermined period, and means for drawing said slide fastener stringer around said roller in contact with said unsupported thermoplastic strip including means for taking up and storing said slide fastener stringer.

6. In an apparatus for securing an unsupported thermoplastic strip to a slide fastener stringer, the improvement comprising a padded roller having a deformable release-coated surface, means for heating said deformable release-coated surface to a temperature above the melting point of said unsupported thermoplastic strip, means for rotating said padded roller at a controlled speed, pressure means having a release-coated pressure surface and at least one indentation adapted to receive a portion of said slide fastener stringer, said release-coated pressure surface adapted to hold a portion of said slide fastener stringer and said unsupported thermoplastic strip in juxtaposition against said deformable release-coated surface for a predetermined time, means for conducting said unsupported thermoplastic strip to said roller, means for conducting said slide fastener stringer to said roller and aligning said slide fastener stringer in juxtaposition with said unsupported thermoplastic strip, means for providing electrical power to said heated padded roller including a shaft rotating with said roller and bearing a pair of circumscribing conductive metal tracks, and a stationary bracket carrying a pair of projecting brushes adapted to run in said tracks while said shaft is rotating, said stationary bracket mounted on said apparatus in opposed relationship to said shaft, and spring-loaded means interposed between said pressure means and a pressure actuation apparatus for regulating the pressure exerted by said pressure means on said padded roller.

7. In an apparatus for securing an unsupported thermoplastic strip to a fabric strip, the improvement which comprises a padded roller having a release-coated work surface, means for conducting a continuous length of said fabric strip over a portion of said release-coated work surface, means for conducting a continuous strip of said unsupported thermoplastic material over said release-coated work surface in juxtaposition with said fabric strip, pressure means having a release-coated pressure surface adapted to contact a preselected portion of said fabric strip and including means for heating said release-coated pressure surface to a predetermined temperature above the melting point of said unsupported thermoplastic strip during the time said release-coated pressure surface contacts said fabric strip, and a pressure actuation apparatus operable to urge said heated release-coated pressure surface against said release-coated work surface for a predetermined period to fuse said unsupported thermoplastic strip to said fabric strip.

* * * * *